Patented Mar. 2, 1943

2,312,588

UNITED STATES PATENT OFFICE 2,312,588

PROCESS OF OBTAINING CRYSTALLIZED HEART STIMULANTS

Erich Rabald and Josef Kraus, Mannheim-Waldhof, Germany, assignors to Rare Chemicals, Inc., Nepera Park, N. Y., a corporation of New York No Drawing. Application June 8, 1940, Serial No. 339,583. In Germany April 4, 1939

4 Claims. (Cl. 260—210)

This invention relates to the process of obtaining crystallized heart stimulants and particularly the process of obtaining crystallized heart stimulants from strophanthus seed, digitalis leaves and other vegetable drugs containing same.

It is well known, that it is very difficult to obtain such crystallized products and to prepare same. Often it is necessary to make derivatives of the heart stimulant glycosides, for instance acetylate it first, and by saponification arrive to the crystalline product. The object of this invention is to obtain crystalline heart stimulants not only from the amorphous products but also directly from the crude extract of the raw material.

We have found that heart stimulating glucosides in crystallized form may be obtained in a simplified way and with better yield from their solutions in water, in organic solvents, or in a mixture of both, by having same adsorbed on hydroxides of polyvalent metals, and afterwards fractionating and eluting from the adsorbing material. The pure products may be obtained from the eluates by evaporation, salting out or by precipitation.

The metal hydroxides, which are especially suitable for this process are aluminhydroxide, ferric hydroxide, cupric hydroxide, chromic hydroxide etc. For solvents, water, alcohols, like methanol, ethanol, etc., acetone, ethyl acetate and others, also a mixture of these solvents may be used. For the eluation water, aqueous liquids and other solvents in which the glucosides are soluble, are used if these solvents are miscible with the solvents from which the glucosides are adsorbed. To facilitate the elution it is advisable to dry the adsorbing material after the adsorption.

This process can be used not only for the solutions of the isolated glucosides, but also to prepare crystalline heart stimulating glucosides directly from the crude extracts. Therefore the working up of the crude drugs becomes very much simplified and decidedly more economical than heretofore.

Aluminum oxide has been used already for chromatographic adsorption of strophanthin extracts in chloroform-benzene solution. We have found however that the adsorbing power of aluminum oxide towards heart stimulating glucoside is very much less than that of aluminum hydroxide. For instance, 1.9 grams of aluminum oxide will adsorb 0.14 gram strophanthin from a solution of 1.0 gram amorphous strophanthin in 60 ccs. alcohol, but no crystals can be obtained from the eluate. On the other hand an equivalent amount of aluminum hydroxide under the same condition using the same strophanthin will adsorb the entire amount of strophanthin. From the eluate the strophanthin can be crystallized out with a 40% yield.

Example 1

5 grams sheet aluminum is amalgamated in aqueous solution of mercury bichloride and decomposed in 90% ethyl alcohol. To the obtained suspension of aluminum hydroxide a solution of 5 grams strophanthin in 60 ccs. ethylalcohol is added, and shaken for several hours. The aluminum hydroxide sediment, on which the K-strophanthin is now adsorbed is collected on a suction filter and dried. The dried product is then extracted several times with water. The aqueous extracts which contain all the strophanthin, are united and saturated with ammonium sulfate. The salted out strophanthin is collected and dried. This salted out strophanthin may be taken up in isopropylalcohol by shaking out, the solution dried and evaporated. By recrystallizing the residue from methanol-chloroform, 1.84 g. of the product is obtained in crystalline form.

Example 2

Aluminum hydroxide is prepared from an aluminum sulfate solution by precipitation with ammonia. The supernatant liquid is decanted, and replaced with water several times. This is repeated a few times with ethyl alcohol to remove as much water as possible. To the suspension of aluminum hydroxide in alcohol a solution of strophanthin in alcohol is added and shaken for several hours. The sediment is now collected on a suction filter or centrifuge and worked up as in Example 1.

Example 3

The fat is removed from the *Strophanthus kombe* seeds and then an alcoholic extract is prepared from the same. This extract is shaken with aluminum hydroxide prepared according to Example 1. For the extract representing 100 grams fat free seeds so much aluminum hydroxide is used that same shall be equivalent to 4–5 grams aluminum oxide. After shaking the aluminum hydroxide is collected on a centrifuge, washed with a little absolute alcohol to remove the dyestuffs which are also adsorbed, dried, and eluated three times, in each case with 180 cc. water. The united aqueous eluates are saturated with ammonium sulfate and the separated material collected on a suction filter. The material is now recrystallized from methanol-chloroform, and the product obtained corresponds to K-strophantosid in its physical and other characteristics.

*Example 4*

5 grams crude glycosides obtained from *Digitalis purpurea*, which mostly contain glucosides of gitoxin-group, are dissolved in a mixture of 80 ccs. ethanol and 20 ccs. acetone. To this solution, under shaking, first 10 ccs. water is added and then a suspension of aluminum hydroxide (equivalent to 8 grams aluminum oxide) in 150 ccs. ethanol. The adsorbat is collected and eluated with pyridine. The pyridine solution is concentrated to a small volume in vacuum and diluted with ethanol. On careful addition of water gitoxin crystallizes out. M. P. 278°.

*Example 5*

A suspension of chromic hydroxide is prepared from a solution of chromic sulfate and ammonia. This is purified by decantation with water till the chromic hydroxide is practically free from sulfuric acid. This is repeated several times with ethanol to remove the water from same. The so obtained chromic hydroxide is now suspended in ethanol and an alcoholic solution of K-strophanthin is added. It is now shaken for several hours and afterwards centrifuged. Most of the K-strophanthin is now adsorbed to the chromic hydroxide. The collected adsorbat is now placed into an acetone-ether (1:3) mixture, well stirred up and again collected. After being dried in vacuum at 50–70° for a short time it is eluated with dilute alcohol (50–70%). The eluate is evaporated and the residue recrystallized from a mixture of water, acetone and ether. The product has an optional rotation of $\alpha_0 = +13°$ in water.

Having so described our invention of preparing crystalline heart stimulating glucosides, what we claim as new is:

1. The process of obtaining crystallized digitalis glucosides and strophanthus glucosides which comprises treating a solution of a member of the group consisting of digitalis glucosides and strophanthus glucosides in at least one member of the group consisting of lower aliphatic mono-hydric alcohols, acetone and ethyl acetate with a three-valent metal hydroxide of the iron group, separating the thus treated three-valent metal hydroxide of the iron group and its adsorbed glucosides from the solvent; drying the thus separated three-valent metal hydroxide of the iron group and its adsorbed glucoside, eluating the glucoside from the three-valent metal hydroxide of the iron group with solvents which are miscible with the solvents from which the glucosides are adsorbed and which do not dissolve the said metal hydroxide of the iron group, removing the said metal hydroxide of the iron group from the glucoside and crystallizing the glucoside from said solution.

2. The process of obtaining crystallized digitalis glucosides and strophanthus glucosides which comprises treating a lower aliphatic mono-hydric alcoholic solution of a member of the group consisting of digitalis glucosides and strophanthus glucosides with a three-valent metal hydroxide of the iron group, separating the thus treated three-valent metal hydroxide of the iron group and its adsorbed glucosides from the solvent; drying the thus separated three-valent metal hydroxide of the iron group and its adsorbed glucoside, eluating the glucoside from the three-valent metal hydroxide of the iron group with solvents which are miscible with the solvents from which the glucosides are adsorbed and which do not dissolve the said metal hydroxide of the iron group, removing the said metal hydroxide of the iron group from the glucoside and crystallizing the glucoside from said solution.

3. The process of obtaining crystallized digitalis glucosides and strophanthus glucosides which comprises treating a solution of a member of the group consisting of digitalis glucosides and strophanthus glucosides in at least one member of the group consisting of lower aliphatic mono-hydric alcohols, acetone and ethyl acetate with aluminum hydroxide, separating the thus treated aluminum hydroxide and its adsorbed glucoside from the solvent; drying the thus separated aluminum hydroxide and its adsorbed glucoside, eluating the glucoside from the aluminum hydroxide with solvents which are miscible with the solvents from which the glucosides are adsorbed and which do not dissolve the said aluminum hydroxide, removing the said aluminum hydroxide from the glucoside and crystallizing the glucoside from said solution.

4. A process of obtaining crystallized digitalis glucosides and strophanthus glucosides which comprises treating a lower aliphatic mono-hydric alcoholic solution of a member of the group consisting of digitalis glucosides and strophanthus glucosides with aluminum hydroxide, separating the thus treated aluminum hydroxide and its adsorbed glucoside from the solvent; drying the thus separated aluminum hydroxide and its adsorbed glucoside, eluating the glucoside from the aluminum hydroxide with solvents which are miscible with the solvents from which the glucosides are adsorbed and which do not dissolve the said aluminum hydroxide, removing the said aluminum hydroxide from the glucoside and crystallizing the glucoside from said solution.

ERICH RABALD.
JOSEF KRAUS.